United States Patent [19]

Maeda

[11] 4,347,919

[45] Sep. 7, 1982

[54] ONE REVOLUTION CLUTCH ASSEMBLY USING GEARS

[75] Inventor: Katsumi Maeda, Shizuoka, Japan

[73] Assignee: Star Seimitsu Kabushiki Kaisha, Japan

[21] Appl. No.: 135,325

[22] Filed: Mar. 31, 1980

[30] Foreign Application Priority Data

Mar. 30, 1979 [JP] Japan ................................. 54-38593

[51] Int. Cl.³ ...................... F16D 11/02; F16H 27/02; F16H 27/08

[52] U.S. Cl. .................................... 192/33 R; 74/113; 74/116; 74/435

[58] Field of Search ................. 74/113, 435, 116, 118, 74/84 R; 192/33 R, 139

[56] References Cited

U.S. PATENT DOCUMENTS 3,375,883 4/1968 Schadlich ......................... 74/435 X
3,495,693 2/1970 Limberger .......................... 74/84 X
3,592,311 7/1971 Chou et al. ............................ 197/1
3,798,993 3/1974 Nayak .................................. 74/435
4,003,267 1/1977 Busch ............................... 74/435 X
4,023,813 5/1977 Dennis ............................. 74/435 X

FOREIGN PATENT DOCUMENTS 49-41533 11/1974 Japan .

*Primary Examiner*—Rodney H. Bonck

*Attorney, Agent, or Firm*—Robert E. Burns; Emmanuel J. Lobato; Bruce L. Adams

[57] ABSTRACT

A one revolution clutch assembly is provided which transmits the rotation of a normally rotating drive shaft to a driven rotating body through gears and which interrupts the rotation of the driven body when it has rotated through one revolution. The one revolution clutch assembly includes a drive gear mounted on the drive shaft and which meshes with a driven gear on the driven body. The driven gear is formed with a hiatus along part of its periphery, and when the hiatus is located opposite to the drive gear, the rotation of the driven gear is interrupted. The driven gear is maintained in this position where it ceases to rotate, by a cam mounted on the driven assembly and formed with a notch which is engaged by a movable piece of an electromagnetic plunger. A crank lever has its one end rotatably mounted on the driven assembly, and imparts a rotating force to the driven gear to cause a meshing engagement of the driven gear with the drive gear when the driven gear is located at said position. When the plunger is actuated to release the driven gear, the crank lever causes a rotation of the driven gear. The timing when a meshing engagement between the driven gear and the drive gear is initiated is determined by a projection on a cam follower which is provided on the driven assembly and which engages a notch in a cam provided on the drive assembly.

5 Claims, 10 Drawing Figures

FIG. 1
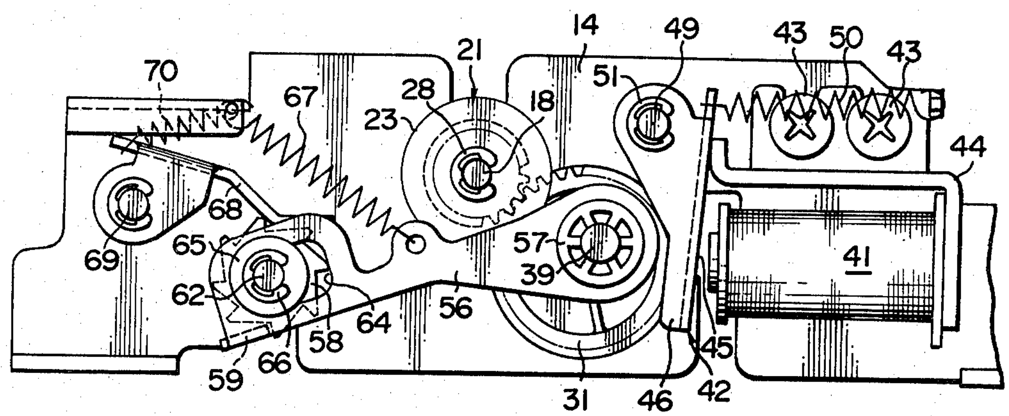
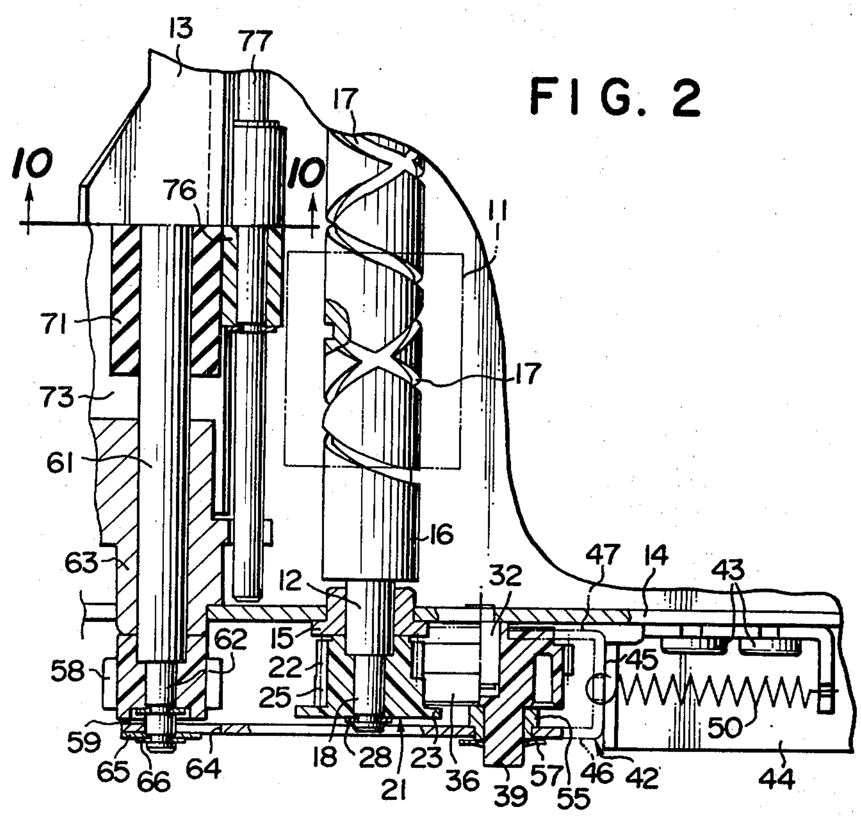

ONE REVOLUTION CLUTCH ASSEMBLY USING GEARS

FIELD OF THE INVENTION

The invention relates to a one revolution clutch assembly which utilizes an intermittent meshing engagement between a drive gear and a driven gear having a hiatus.

A one revolution clutch assembly comprises a drive gear mounted on a normally rotating drive shaft and which is disposed in meshing engagement with a driven gear having a hiatus to cause the latter to rotate through approximately one revolution until the hiatus is rotated opposite to the drive gear, whereupon the rotation of the driven gear is automatically interrupted. Since such one revolution clutch assembly automatically provides a rotation through a given angle at a desired time, it is extensively used to provide a film feeding in a photographic camera, an original or copy sheet feeding in a copying machine, a paper feeding in a high speed printer or the like. In a clutch assembly of this kind, it will be noted that when the meshing engagement between the drive and the driven gear is initiated, there is a likelihood that the teeth of the both gears move into abutment against each other to produce sound of purcussion or to cause a damage thereto. In particular, when the drive shaft is rotating at a high speed, a control of the timing is of a greater importance.

DESCRIPTION OF THE PRIOR ART

Japanese Patent Publication No. 54-41, 533 discloses a one revolution clutch assembly in which a first intermediate gear is disposed between a drive gear and a driven gear having a hiatus and is maintained in rotation by means of the drive gear. A rotating gear is disposed in coaxial relationship with the driven gear and meshes with the first intermediate gear, and a disc is interposed between the rotating gear and the driven gear. The disc is connected with the rotating gear and is maintained in frictional engagement with the driven gear. A second intermediate gear is disposed in coaxial relationship with the first intermediate gear, and is adapted to be interlocked with the drive gear. The driven gear is loosely fitted on the shaft on which the rotating gear is mounted, and by engaging a lever member which serves as a stop with a projection formed on one side of the driven gear, only the driven gear can be stopped. The lever member is normally urged into engagement with the projection in a resilient manner, and when the lever member is manually disengaged from the projection against the resilience, the driven gear is guided into its position where it meshes with the second intermediate gear as a result of its frictional engagement with the rotating gear, whereby it is driven by the second intermediate gear. As the driven gear rotates through one revolution to bring its hiatus into alignment with the second intermediate gear, the lever member is simultaneously engaged with the projection on the driven gear, whereby the driven gear comes to a stop against the frictional engagement with the rotating gear.

In the one revolution clutch assembly described, the hiatus of the driven gear is provided with a movable tooth piece which projects from the surface of the hiatus region under the resilience of a spring and which is located in the rear end, as viewed in the direction of rotation of the driven gear, of the hiatus or at the end of the train of teeth for adjusting the manner of its meshing engagement with the second intermediate gear. Because the clutch assembly described requires an increased number of rotation transmitting gears, its construction is complex. In addition, because the frictionally engaging disc is used to control the transmission of the rotation of the drive gear to the driven gear, heat is produced as a result of friction between the disc and the driven gear during a high speed operation of the drive gear if the driven gear is maintained stationary by the frictional disc for a prolonged period of time.

SUMMARY OF THE INVENTION

It is an object of the invention to provide a one revolution clutch assembly using gears which is simple in construction and which is capable of positively transmitting the rotation of a drive shaft to a driven rotating assembly at a desired time and also capable of stopping the motion of the driven rotating assembly after one revolution thereof.

It is another object of the invention to provide a one revolution clutch assembly which maintains a driven rotating assembly firmly in position whenever it is disengaged from a drive rotating assembly and in which the driven rotating assembly is forced into initial engagement with the drive rotating assembly when desired, thus positively achieving an interruption of motion and the engagement with the drive rotating assembly of the driven rotating assembly.

In accordance with the invention, there is provided a one revolution clutch assembly comprising a drive rotating assembly which is mounted on a continuously rotating drive shaft, the drive assembly including a cylindrical cam carrying an engaging portion at a point on its peripheral surface and a drive gear disposed for integral rotation with the cam, a driven rotating assembly including a driven gear having a hiatus along part of its periphery and disposed for intermittent engagement with the drive gear and a cylindrical cam follower disposed for integral rotation with the driven gear and carrying a mating portion on its peripheral surface which is adapted to engage the engaging portion, a retainer for retaining the driven gear in position whenever the hiatus of the driven gear is located opposite to the drive gear, and an engagement guiding device for guiding the cam follower into a position where it is engageable with the engaging portion of the cam when the retainer ceases to retain the driven gear, the mating portion being located such that when it has engaged the engaging portion to permit a rotation of the driven assembly, the drive gear can mesh with a tooth on the driven gear which is located at the terminal end, as viewed in the direction of rotation, of the hiatus.

According to the invention, when the driven rotating assembly remains at rest with the hiatus of the driven gear located opposite to the drive gear, a detent on the retaining cam associated with the driven rotating assembly is engaged by the movable piece of an electromagnetic plunger, which maintains the assembly at this rest position. At this time, the crank lever of the engagement guiding device is biased to cause a rotation of the driven rotating assembly in a direction to engage the projection on the cam follower of the driven rotating assembly with the cam surface of the drive rotating assembly. Hence, when the electromagnetic plunger is actuated to release the engagement between the movable member and the detent on the retaining cam, the crank lever causes the projection on the cam follower of the driven assembly to engage with the cam surface of the drive assembly immediately. Since the projection on the cam follower is maintained in a position to engage the cam surface, the projection can be firmly engaged with a notch formed in the cam. When the driven rotating assembly rotates slightly with the projection engaged with the notch, the tooth on the driven gear which is located next to the terminal end, as viewed in the direction of rotation, of the hiatus will mesh with teeth on the drive gear. Thereafter the driven rotating assembly is continuously rotated by the drive gear until the driven gear rotates through one revolution, whereupon the movable member engages the detent to bring the driven gear to a stop.

In this manner, since the rotation of the driven gear is initiated by the cam mechanism in accordance with the invention, the difficulties associated with the abutment of the teeth of the drive and the driven gear against each other are improved. This arrangement of the invention is particularly applicable to the utilization of a high speed rotation of the drive shaft such as the rotation of a print head drive shaft associated with a high speed printer, to operate a clutch assembly which is used to feed a record paper. In this instance, a ratchet wheel may be mounted on the other end of the crank lever and may be driven through an angle corresponding to one ratchet for each reciprocating motion of the other end of the crank lever, thus achieving a paper feed by utilizing the rotation of the ratchet wheel.

BRIEF DESCRIPTION OF THE DRAWINGS

FIG. 1 is a schematic side elevation of a serial printer incorporating a one revolution clutch assembly according to one embodiment of the invention;

FIG. 2 is a plan view of the arrangement shown in FIG. 1, with part shown in cross section;

DESCRIPTION OF PREFERRED EMBODIMENT

Figure 3:
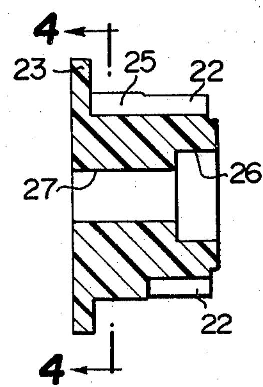
FIG. 3 is a longitudinal section of a drive rotating assembly of the clutch assembly shown in FIG. 1.

Referring to the drawings, one embodiment of the invention will now be described as applied to a paper feeding mechanism of a high speed serial printer. Such a high speed serial printer is disclosed in U.S. Pat. No. 3,592,311 issued to Chou et al. on July 13, 1971, for example, and hence only those parts of the printer which relate to the one revolution clutch assembly of the invention will be shown and described.

Referring to FIGS. 1 and 2, there is shown a carriage 11 in phantom line which holds the free end of a printer head, not shown, of a serial printer. While not shown, the carriage 11 is formed with a bore which extends therethrough in the horizontal direction and in which a drive shaft 12 is loosely fitted. The drive shaft 12 is disposed parallel to a platen 13 which is formed by bending a flat sheet into a substantially L-configuration. One end of the drive shaft 12 is rotatably supported by a bearing 15 which is disposed in a sideplate 14 of a frame. While not shown, the other end of the drive shaft 12 is similarly supported in a rotatable manner by a bearing disposed in another sideplate. A cylindrical cam body 16 is concentrically disposed on the drive shaft 12, and a right-hand and a left-hand screw-shaped cam groove 17 are formed in the peripheral surface of the cam body 16. The cam groove 17 is engaged by the free end of a detent pin, not shown, which is disposed on the carriage 11, whereby the rotation of the drive shaft 12 causes a reciprocating movement of the carriage 11 along the drive shaft 12. In the embodiment shown, when the drive shaft 12 rotates through five revolutions, for example, the carriage 11 moves from its print start position to its terminal point which is spaced therefrom by a maximum distance. In the meantime, the print head effects a printing operation. When the drive shaft 12 continues to rotate through further three revolutions, for example, the carriage 11 is returned to its start position while feeding a record paper. Consequently, the right-hand and the left-hand screw-shaped cam groove 17 have different pitches.

Figure 4:
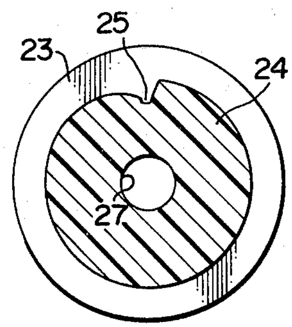
FIG. 4 is a cross section taken along the line 4—4 shown in FIG. 3.

One end of the drive shaft 12 which projects beyond the bearing 15 is integrally formed with a concentric reduced diameter portion 18 on which a drive rotating assembly 21 which is integrally formed of a metal or a synthetic resin material is concentrically fitted. As best shown in FIGS. 3 and 4, the drive rotating assembly 21 comprises a drive gear 22 carrying uniformly spaced teeth on its circumference surface adjacent to the bearing 15, a flange 23 formed on the other end thereof, and a surface cam 24 which is formed between the drive gear 22 and the flange 23. In its peripheral surface, the cam 24 is formed with an axially extending notch 25. The drive rotating assembly 21 is formed with a through-bore in alignment with the axis thereof into which the drive shaft 12 as well as the reduced diameter portion 18 extend. The bore comprises a first bore portion 26 into which the free end of the drive shaft 12 is inserted, and the second bore portion 27 through which the reduced diameter portion 18 extends. The free end of the shaft portion 18 projects beyond the second bore portion 27, and receives an E-shaped ring 28 thereon, which operates to constrain an axial movement of the drive rotating assembly 21.

Figure 5:
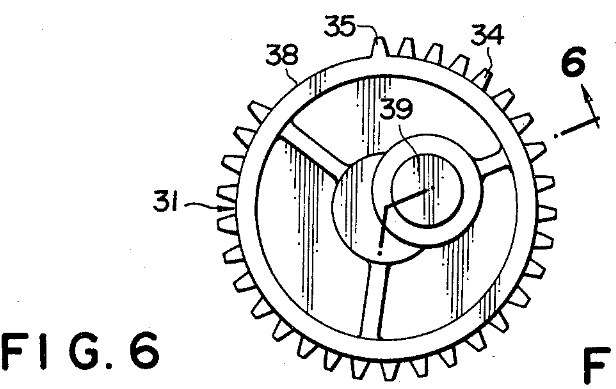
FIG. 5 is a front view of a driven rotating assembly of the clutch assembly shown in FIG. 1.
Figure 6:
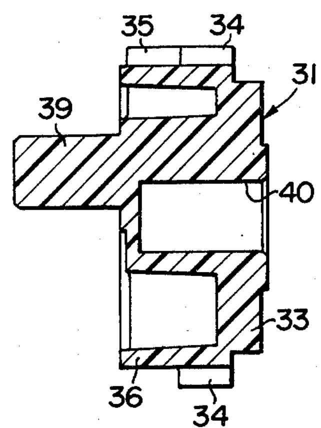
FIG. 6 is a cross section taken along the line 6—6 shown in FIG. 5.
Figure 7:
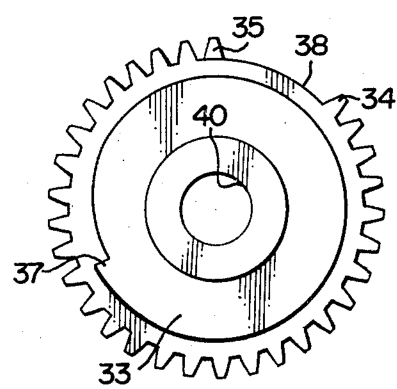
FIG. 7 is a rear view of the driven rotating assembly shown in FIG. 5.

A driven rotating assembly 31 which is intermittently driven by the drive rotating assembly 21 has its one end rotatably mounted on a support shaft 32 which is fixedly mounted on the sideplate 14. The support shaft 32 is supported so that its axis extends parallel to the axis of the drive rotating assembly 21. The driven rotating assembly 31 is integrally formed of a metal or a synthetic resin material, and comprises, as best shown in FIGS. 5 to 7, a cylindrical retaining cam 33 which is located nearer the sideplate 14, a driven gear 34 located adjacent to the cam 33, having a greater diameter than the retaining cam 33 and disposed for meshing engagement with the drive gear 22, and a cylindrical cam follower 36 of the same diameter as the driven gear 34 and having a projection 35 which is adapted to engage the cam 24 on the drive rotating assembly 21. In its peripheral surface, the retaining cam 33 is formed with a projection 37, and the driven gear 34 is formed with a hiatus 38 which is utilized to disengage the meshing engagement between the gears 34, 22. The hiatus 38 has a peripheral length which is approximately equal to five times the pitch of teeth on the driven gear 34 in the present embodiment. The projection 35 is located such that it is advanced from the terminal position of the hiatus 38, as viewed in the direction of rotation, toward the other end of the hiatus 38 by a distance corresponding to one-fourth the pitch of the teeth on the driven gear 34. A lever drive shaft 39 is integrally formed on the end face of the driven rotating assembly 31 which is adjacent to the cam follower 36, in an offset manner from the axis of the assembly 31. The lever drive shaft 39 extends in the direction perpendicular to the end face on which it is formed so as to extend parallel to the axis of the assembly 31. In its region adjacent to the cam portion, the driven assembly 31 is formed with an opening 40 in alignment with the axis thereof for receiving the support shaft 32 therein. The flange 23 on the drive assembly 21 projects toward the end face of the driven assembly 31 on which the lever drive shaft 39 is formed, whereby the axial position of the driven assembly 31 is controlled by the flange 23.

Figure 8:
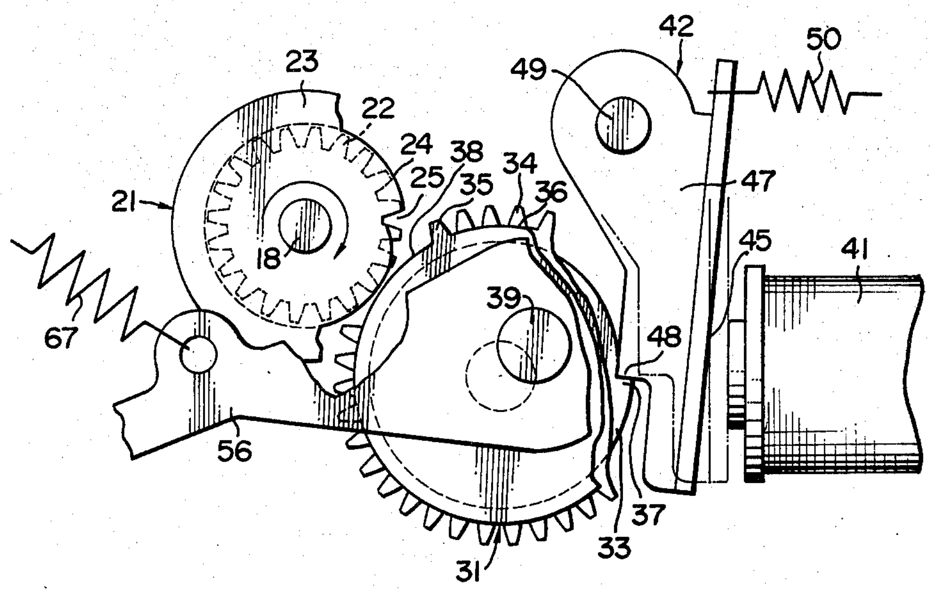
FIGS. 8 and 9 are illustrations, partly removed, of the operation of the clutch assembly shown in FIG. 1.

The retaining cam 33 of the driven assembly 31 is engaged by a movable iron piece 42 of an electromagnetic plunger 41, which is mounted on a support frame 44 by set screws 43 so that its axis extends horizontally. The support frame 44 is fixedly mounted on the sideplate 14. The movable iron piece 42 includes an attracted surface 45 which is disposed in opposing relationship with and attracted to the electromagnetic plunger 41 whenever it is energized, and a pair of side faces 46, 47 which extend at right angles to the surface 45 from the opposite sides thereof. In its lower region, the side face 47 is formed with an engaging nose 48, as shown in FIG. 8. The upper end of the movable iron piece 42 is pivotally mounted on a pin 49 which has its one end secured to the sideplate 14. A spring 50 has its one end anchored to the support frame 44 and has its other end secured to the upper end of the movable iron piece 42 for normally maintaining the nose 48 in engagement with the retaining cam 33 on the driven assembly 31. When the nose 48 engages the projection 37 on the retaining cam 33, it ceases the rotation of the driven assembly 31, maintaining the engagement unless the plunger 41 is actuated to attract the movable iron piece 42 against the resilience of the spring 50. The engagement between the projection 37 and the nose 48 takes place when the meshing engagement between the drive gear 22 on the drive assembly 21 and the driven gear 34 on the driven assembly 31 is terminated, that is, when the driven assembly 31 has rotated to bring its hiatus 38 into opposing relationship with the drive gear 22 to prevent the rotation of the drive gear 22 from being transmitted to the driven gear 34. Consequently, so long as the engagement between the projection 37 and the nose 48 is maintained, the rotation of the drive assembly 21 cannot be transmitted to the driven assembly 31. It will be noted that the movable iron piece 42 is locked on the pin 49 by means of an E-ring 51 which is mounted on the free end of the support pin 49.

A crank lever 56 has its one end rotatably mounted on the lever drive shaft 39 of the driven assembly 31 through a bearing 55. The crank lever 56 is locked to the lever drive shaft 39 by means of a stop ring 57. The other end of the crank lever 56 fixedly carries a tab 59 which engages the ratchet on a ratchet wheel 58 to rotate it. Specifically, during a reciprocating movement of the crank lever 56 in the lateral direction in response to the rotation of the driven assembly 31, when the crank lever 56 moves to the right, as viewed in FIG. 1, the tab 59 engages one of the ratchets to cause the ratchet wheel 58 to rotate counter-clockwise, as viewed in FIG. 1. The ratchet wheel 58 is fitted over and fixed on one end of a paper feed drive shaft 61, which is located on the opposite side of the platen 13 from the carriage 11, and on a reduced diameter shaft 62 which extends coaxially from said one end. The opposite ends of the drive shaft 61 are rotatably mounted in the sideplate 14 by means of bearings 63. The free end of the reduced diameter shaft 62 projects from the ratchet wheel 58 and is loosely received in an elongate slot 64 formed in the other end of the crank lever 56. It will be seen that the slot 64 is elongate in the lateral direction in order to guide a reciprocating movement of the crank lever 56 in the lateral direction. The extremity of the reduced diameter shaft 62 which projects through the slot 64 fixedly carries a disc 65, of a diameter which is greater than the length along the major axis of the elongate slot 64, as well as an E-ring 66 thereon. The combination of the disc 65 and the E-ring 66 serves to lock the crank lever 56 to the shaft 62. A spring 67 has its one end anchored to the sideplate 14 and its other end anchored to the crank lever 56 for normally biasing the crank lever 56 to the left, as viewed in FIG. 1. The bias applied to the crank lever 56 to urge it to the left remains ineffective while the projection 37 on the cam 33 of the driven assembly 31 remains engaged with the nose 48 on the movable iron piece 42 of the electromagnetic plunger 41, but is effective to cause a movement of the crank lever 56 to the left whenever the engagement is terminated. The resulting movement of the crank lever 56 causes the driven assembly 31 to rotate, whereby the projection 35 on the cam follower 36 of the driven assembly 31 is engaged with the notch 25 formed in the cam 24 of the drive assembly 21, thus transmitting the rotation of the drive assembly 21 to the driven assembly 31. When the driven assembly 31 rotates counter-clockwise, and the spring 67 is formed by a tension spring, the lever drive shaft 39 is preferably located as shown in FIG. 1 when the projection 35 is engaged with the notch 38. On the other hand, when the spring 67 comprises a compression spring, the lever drive shaft 39 is preferably located on the side face of the driven assembly 31 at a location which is 180° displaced from the position shown in FIG. 1.

The purpose of the ratchet wheel 58 is to cause a forward movement of a record paper by an amount corresponding to one line in response to its rotation through an angle corresponding to one ratchet. The ratchet wheel 58 is resiliently constrained from freely rotating by a constraining lever 68. Specifically, the constraining lever 68 has its one end rotatably mounted on a support pin 69 which has its one end fixedly mounted on the sideplate 14. This end of lever 68 is engaged by one end of a spring 70 which has its other end anchored to the sideplate 14. The spring 70 urges the constraining lever 68 into resilient abutment against the ratchets on the ratchet wheel 58, thereby preventing a reverse rotation thereof.

Figure 10:
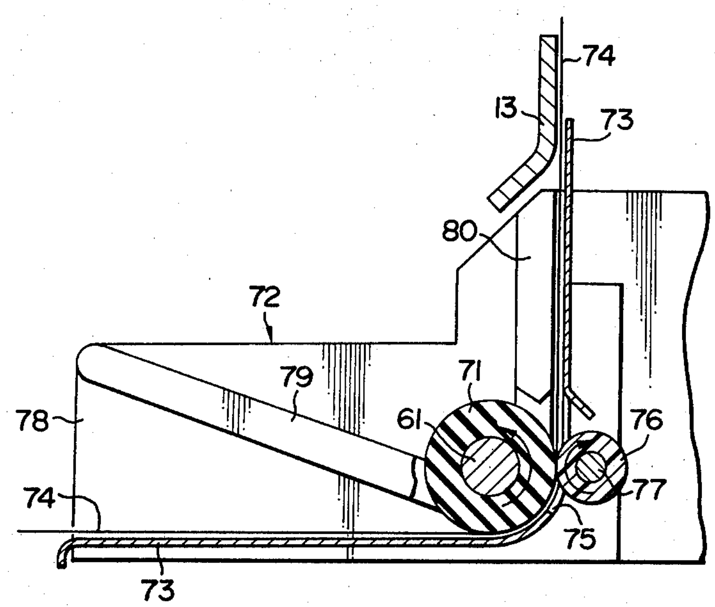
FIG. 10 is a cross section taken along the line 10—10 shown in FIG. 1, illustrating a paper feeder of the serial printer shown in FIG. 1.

As shown in FIG. 2, a paper feed roller 71 is fixedly mounted on an intermediate portion of the paper feed drive shaft 61, and is disposed in the bottom of a paper feed chamber 72 as shown in FIG. 10. The bottom of the chamber 72 is defined by a paper feed guide plate 73, which is arranged to serve as a guide surface which feeds a record paper 74, as it has been fed along the guide plate 73, toward the platen 13. It will be seen that the left-hand end of the guide plate 73 extends upright from its lower portion. In its region adjacent to the feed roller 71, the guide plate 73 is formed with an elongate slot 75 extending axially of the roller 71 and into which a follower roller 76 normally extends for resilient abutment against the peripheral surface of the feed roller 71. The follower roller 76 has its opposite ends rotatably carried by support studs 77 which are mounted on the guide plate 73. The lateral sides of the chamber 72 are defined by opposite sidewalls 78 which are spaced apart by a distance which is at least slightly greater than the width of the record paper 74. In the region adjacent to the inlet of the record paper, the top of the chamber 72 is defined by an upper guide member 79 which projects from the sidewall 78 and which is inclined downwardly toward the feed roller 71. In order to assure that the record paper 74 as fed between the feed roller 71 and the follower roller 76 is properly supplied to the platen 13, an upright guide member 80 is disposed in opposing relationship with an upstanding portion of the guide plate 73. The upright guide member 80 is mounted on the sidewall 78. The sidewalls 78, the upper guide member 79 and the upright member 80 of the chamber 72 are integrally molded from a synthetic resin material or the like.

Figure 9:
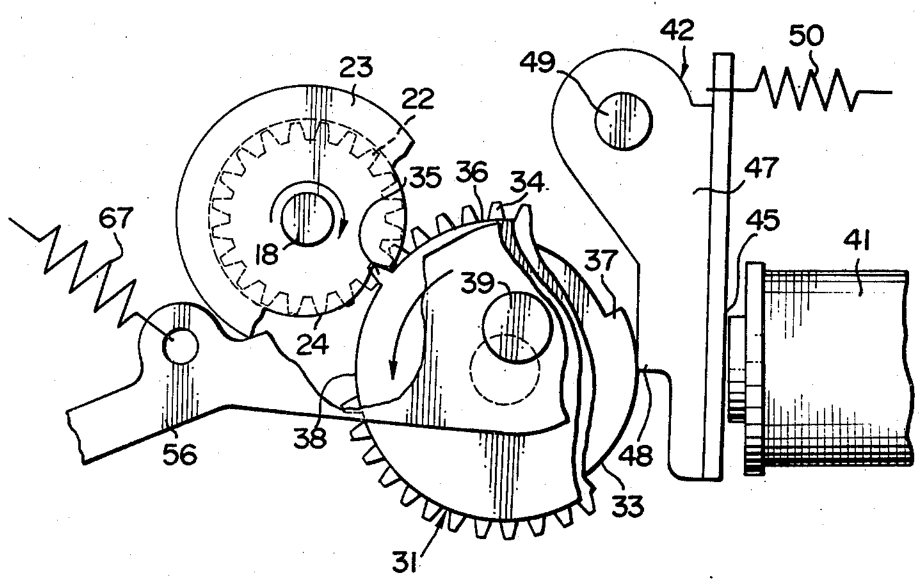

In operation, the electromagnetic plunger 41 is in its off condition as shown in FIG. 8, so that the nose 48 on the movable iron piece 42 is engaged with the projection 37 on the retaining cam 33 of the driven assembly 31. The driven gear 34 of the driven assembly 31 has its hiatus 38 disposed in opposing relationship with the drive gear 22 of the drive assembly 21, so that the rotation of the drive assembly 21 cannot be transmitted to the driven assembly 31. Consequently, only the drive assembly 21 rotates clockwise, as viewed in FIG. 8. This rotation of the drive assembly 21 results from the rotation of the drive shaft 12, which also causes the carriage 11 to move upwardly from its lowermost position shown in FIG. 2, thus effecting a printing operation by means of a printer head. Upon completion of a printing operation, the printer head again begins to move down, as viewed in FIG. 2. At this time, a timing pulse is applied to the electromagnetic plunger 41 in order to provide a line feed of the record paper 74 by one line. When the plunger 41 is momentary energized by the timing pulse, the bottom portion of the movable iron piece 42 is attracted to the plunger 41 against the resilience of the spring 50, thereby terminating the engagement between the nose 48 and the projection 37, as shown in phantom line in FIG. 8. Hence, the driven assembly 31 becomes rotatable, whereby the crank lever 56 which has been urged to the left, as viewed in FIG. 8, by the spring 67 moves to the left. This movement causes the driven assembly 31 to rotate counter-clockwise, which in turn brings the projection 35 on the cam follower 36 of the driven assembly 31 to a position where it is engageable with the notch 25 formed in the cam 24 of the drive assembly 21. Consequently, when the projection 35 engages the notch 25 as the drive assembly 21 rotates, the driven assembly 31 also rotates counter-clockwise, as indicated in FIG. 9, whereby the tooth on the driven gear 35 which is located at the terminal end of the hiatus 38 will be engaged with the teeth on the drive gear 34 of the drive assembly 21 to establish a transmission of rotation between the drive and the driven assembly 21, 31. In this manner, the driven assembly 31 begins to rotate. As the driven assembly 31 rotates, one end of the crank lever 56 is subject to an angular movement to cause the other end thereof to move to the left from its position shown in FIG. 1. After rotating through about 180° from the position shown, the other end of the crank lever 56 moves to the right, thus undergoing a reciprocating movement of the crank mechanism. In response to the movement of the crank lever 56 to the left, the tab 59 on the crank lever 56 is disengaged from the ratchet on the ratchet wheel 58 with which it has been engaged, and then moves into engagement with the next following ratchet. In response to the movement of the crank lever 56 to the right, the ratchet which has been engaged with the tab 59 is rotated counter-clockwise. It should be noted that during the movement of the crank lever 56 to the left, the constraining lever 68 cannot cause a rotation of the ratchet wheel 58 in the reverse direction. The rotation of the ratchet wheel 58 in the counter-clockwise direction causes the paper feed roller 71 to rotate counter-clockwise, as viewed in FIG. 10, feeding the record paper 74 toward the platen 13.

When the driven assembly 21 has rotated through one revolution, the hiatus 38 of the driven gear 34 moves to a position where it is located opposite to the drive gear 22 of the drive assembly 21, thereby terminating the engagement between the both gears. The nose 48 on the movable iron piece 42 engaged with the cam surface of the retaining cam 33 by the spring 50 now engages the projection 37 on the cam 33 of the driven assembly 31, maintaining the latter at a position where it is disengaged from the drive assembly 21. If the plunger 41 continues to be actuated by continuously supplying the timing pulses, it is possible to continue the transmission of the rotation of the drive assembly 21 to the driven assembly 31, enabling a continuous repetition of an intermittent paper feed operation.

It is to be understood that the drive shaft 12 rotates through three revolutions in order to return the carriage 11 to its original position, so that even if the notch 25 formed in the cam 24 of the drive assembly 21 has moved past the projection 35 on the cam follower 36 of the driven assembly 31, when the plunger 41 is actuated, an engagement of the notch 25 with the projection 35 can occur whenever it moves past the latter. In this manner, the remaining two revolutions of the drive shaft 12 can be utilized to enable the driven assembly 31 to rotate through one revolution. In this instance, there will be a time lag from the actuation of the electromagnetic plunger 41 until the driven assembly 31 is operated which is at its maximum when it is necessary to wait for the drive shaft 12 to rotate through one revolution. However, in the printer here considered, the drive shaft 12 rotates at a high speed, for example, 1,200 rpm, and hence this presents no problem for practical purposes. The rotation of the drive shaft 12 at a high speed can be transmitted to the driven assembly 31 with a speed reduction, by choosing a turn ratio between the drive gear 22 and the driven gear 34 which may be 2:1, for example. In this manner, an increased accuracy can be achieved in the transmission of the rotation of the drive assembly 21 to the driven assembly 31.

In the embodiment described above, the drive gear 22 and the cam 24 of the drive assembly 21 are integrally formed as are the retaining cam 33, the driven gear 34 and the cam follower 36 of the driven assembly 31. However, it should be understood that these members may be formed separately and mounted on the drive shaft 12 and the reduced diameter portion 18, respectively, or fixedly mounted on the support shaft 32 which is rotatably mounted. In this manner, the support shaft may be extended to the opposite sideplate of the frame so that the retaining cam 33 can be fixedly mounted on the support shaft 32 which is secured to the opposite sideplate, with the electromagnetic plunger 41 and the movable iron piece 42 mounted on this sideplate. Also, while the cam 24 of the drive assembly 21 is provided with a single notch shown at 25 in its peripheral surface, the peripheral surface of the cam 24 may be formed with a plurality of spaced notches in order to reduce a variation in the length of the time lag from the actuation of the electromagnetic actuator until the engagement is established between the projection 35 on the cam follower 36 of the driven assembly 31 and the notch 25.

What is claimed is:

1. A one revolution clutch assembly comprising:

a drive rotating assembly which is mounted on a continuously rotating drive shaft, the drive assembly including a cylindrical cam having an engaging portion at a point on its peripheral surface, and a drive gear disposed for integral rotation with the cam;

a driven rotating assembly including a driven gear having a hiatus along part of its periphery and disposed for intermittent engagement with the drive gear, and a cylindrical cam follower disposed for integral rotation with the driven gear and having on its peripheral surface means for engaging the engaging portion of the cylindrical cam;

a retainer for retaining the driven gear in position whenever the hiatus of the driven gear is located opposite to the drive gear, the retainer comprising a cylindrical retaining cam coaxially mounted on the driven assembly, and a movable piece having its one end biased by a combination of an electromagnetic plunger and a spring into engagement with the retaining cam, the actuation of the electromagnetic plunger being effective to attract the movable piece against the resilience of the spring, the movable piece being engageable with a detent on the retaining cam to retain the driven assembly in position; and an engagement guiding device for guiding the cam follower into a position where it is engageable with the engaging portion of the cam when the retainer ceases to retain the driven gear, the engagement guiding device comprising a lever drive shaft mounted on a side face of the driven assembly at a location which is eccentric to the axis thereof, a crank lever having its one end rotatably mounted on the lever drive shaft, and resilient means connected to the crank lever for biasing the crank lever in one direction resiliently, the lever drive shaft being located such that when the retainer ceases to retain the driven gear, the crank lever permits a rotation of the driven assembly in order to engage the means for engaging of the cam follower with the engaging portion of the cam;

the means for engaging being located such that when it has engaged the engaging portion to permit a rotation of the driven assembly, the drive gear can mesh with a tooth on the driven gear which is located at the terminal end, as viewed in the direction of rotation, of the hiatus.

2. A one revolution clutch assembly according to claim 1 in which a gear ratio between the drive gear and the driven gear is chosen to enable a rotation of the driven assembly with a speed reduction.

3. A one revolution clutch assembly according to claim 1 in which the drive gear and the cam of the drive assembly are integrally formed as are the driven gear and the cam follower of the driven assembly.

4. A one revolution clutch assembly according to claim 1: wherein the drive rotating assembly is comprised of a generally cylindrical body having a peripheral surface portion defining the drive gear, and an adjacent peripheral surface portion defining the cylindrical cam having a notch defining the engaging portion; wherein the driven rotating assembly is comprised of a generally cylindrical body having a peripheral surface portion defining the cylindrical cam follower with a projection therefrom dimensioned to engage the notch in the cylindrical cam and defining the means for engaging, and an adjacent peripheral surface portion defining a driven gear for meshing with and being driven by the drive gear, and the peripheral surface portion defining the driven gear having a portion free of gear teeth and defining the driven gear hiatus.

5. A one revolution clutch assembly according to claim 4, wherein the generally cylindrical body comprising the driven rotating assembly further comprises a peripheral surface portion adjacent the driven gear and defining the retaining cam and having a surface portion defining the retaining cam detent.

* * * * *